United States Patent
Hildebrandt

[11] 3,810,491
[45] May 14, 1974

[54] METHOD OF INSULATING CONDUIT
[75] Inventor: Ullrich Hildebrandt, Munchen, Germany
[73] Assignee: Linde Aktiengesellschaft, Wiesbaden, Germany
[22] Filed: Oct. 26, 1972
[21] Appl. No.: 300,884

[30] Foreign Application Priority Data
Oct. 27, 1971  Germany............................ 2153392

[52] U.S. Cl..................... 138/149, 29/446, 29/455
[51] Int. Cl............................................. F16l 9/14
[58] Field of Search....... 29/446, 455; 138/148, 149

[56] References Cited
UNITED STATES PATENTS

| | | | |
|---|---|---|---|
| 2,707,493 | 5/1955 | Bonvillian et al. | 138/149 X |
| 2,933,917 | 4/1960 | Sampson | 138/149 X |
| 2,962,051 | 11/1960 | Burkes | 138/149 |
| 3,126,918 | 3/1964 | Eaton | 29/455 UX |
| 3,369,826 | 2/1968 | Boosey et al. | 138/149 X |
| 3,397,720 | 8/1968 | Jones | 138/149 |
| 3,439,885 | 4/1969 | Sackleh | 29/455 X |

FOREIGN PATENTS OR APPLICATIONS

| | | | |
|---|---|---|---|
| 372,745 | 5/1932 | Great Britain | 138/149 |
| 1,060,740 | 4/1954 | France | 138/149 |
| 947,583 | 8/1956 | Germany | 138/149 |

Primary Examiner—Charlie T. Moon
Attorney, Agent, or Firm—Karl F. Ross; Herbert Dubno

[57] ABSTRACT

A method of insulating conduit of the double-wall type in which an inner pipe is coaxially surrounded by an outer pipe and the intervening space contains insulating materials as well as some means for positioning the two pipes coaxially. The inter-pipe space is evacuated and the inner tube may be employed for conducting low-temperature fluids and/or for receiving a low-temperature electrical cable, e.g., a superconductor. The insulating material is applied in generally helical bands while spacers are distributed in a helical pattern along the inner pipe and are subsequently removed to permit tension means to be provided between the inner and outer pipes so that the system for relatively positioning the two pipes is not under compression but exclusively under tension.

10 Claims, 5 Drawing Figures

METHOD OF INSULATING CONDUIT

FIELD OF THE INVENTION

My present invention relates to an insulated double-wall conduit and, more particularly, to a method of insulating double-wall pipes, especially for conducting liquefied gases and other low-temperature fluids for cryogenic purposes.

BACKGROUND OF THE INVENTION

In recent years it has increasingly become of interest to be able to conduct low-temperature fluids over long distances with a minimum heat inflow into the system (so-called loss of "cold"). Typical applications of insulated conduit for this purpose are in conducting low-temperature or liquefied gases in air or gas rectification plants, liquefied-gas pipelines and low-temperature electrical transmission systems. In systems of the latter type, a superconductive or nonsuperconductive electrical cable, microwave transmission tube or the like may be constantly in heat-exchanging relationship with a liquefied gas, e.g. liquid helium or hydrogen, to maintain a superconductive state or some other state of high conductivity.

It is common practice in such conduits to provide an inner pipe carrying the liquefied gas directly or via additional ducts therewithin, an outer pipe coaxially surrounding the inner pipe and defining an all-around clearance therewith, a body of insulating material in the space between the two pipes, and means for positioning the two pipes in coaxial relationship.

The body of insulating material, preferably a porous mass to provide gas-trapping or gas-obstructing cells, generally fills the space between the two pipes, which space may be evacuated to further increase the insulating character of the space. However, the insulation generally forms the means for positioning the two pipes in coaxial relationship and hence is frequently under compression. This tends to crush the insulating material and reduces the insulating effectiveness of the space below the design criteria. Where spacer bodies are provided within the clearance between the two pipes, they have hitherto been subjected to compression, have been relatively massive, and have constituted heat-conductive bridges between the two pipes.

OBJECTS OF THE INVENTION

It is the principal object of the present invention to provide an improved method of insulating a double-wall conduit of the character described whereby the insulating mass is not placed under compression between the walls of the conduit and heat bridging between the inner and outer conduit minimized.

Another object of this invention is to provide a method of insulating a conduit adapted to accommodate low-temperature fluids such as liquefied gases, e.g. for the transport thereof and/or for the cooling of superconductor electrical cables and the like, which will have a low heat influx or cold loss.

Another object of the invention is to provide an improved insulated conduit for the purpose described which is of low cost, high insulating efficiency, and particular advantage for use with low-temperature fluids.

SUMMARY OF THE INVENTION

These objects and others which will become apparent hereinafter are attained in accordance with the present invention, with a system designed to reduce the cost of insulating double-wall conduit for the purposes described, to minimize the energy costs in operating a system using such conduit by minimizing heat influx or cold outflow, and to eliminate the aforementioned disadvantages. The system comprises the steps of applying at spaced locations generally helically around the periphery of the inner pipe, rigid spacer elements which extend preferably radially, and winding the insulating bands substantially helically between these elements, generally to the height thereof so that, upon removal of these elements, it is possible to provide tension members which form spacers according to the present invention between the inner and outer pipes at the locations vacated by the spacer elements.

More specifically, I provide upon the outer wall of the inner pipe, upon which the heat-insulating material is to be provided, bars removable substantially in the radial direction, the outer wall of the inner pipe being then wrapped with one or more layers of thermal insulation between these bars and preferably crosswise relative thereto with the insulation until the thickness of the insulation raises it to the top of the bars. The bars are then removed and, at each location vacated by the bar, tensile fastening elements are provided between a holder around the outer lay of insulating material and the inner pipe. The outer pipe is then fitted over the holder and is supported by the holder and the tensile elements.

Since the fastening elements are only located in tension, they can be of small cross-section and the bridged heat at these elements will be a minimum. The use of bars, preferably of a cylindrical configuration, which are removable in the manner stated, allows access to the spaced-apart locations at which the tensile elements are to be provided even after the application of the heat-insulating bands.

According to another feature of the invention, the bars are mounted upon a tape or strip which is applied automatically around the inner pipe and thus serves to space the bars apart by the predetermined distances. Preferably this distance is dimensioned with respect to circumference so that the center-to-center spacing of the bars or pins is equal to one third of the length of each turn of the helix, i.e. the pins are spaced apart by 120° when the band is applied to the inner pipe. The band is applied to the inner pipe. The band is preferably constituted of metal and may be applied to the inner pipe automatically.

According to another feature of the invention, the insulating material, preferably of so-called superinsulation as described in U.S. Pat. No. 3,525,452 or copending application Ser. No. 261,292, filed 12 June 1972, is applied automatically and in a helical pattern. A first wrapping of the insulation may be applied directly upon the pipe with turns spaced from one another by a distance less than the width of the pin-carrying metal band which overlies the same. Alternatively this first band may marginally overlie the metal band. Between the pins, oppositely wrapped bands of insulation may be applied so that the only portions of the pipe not covered by insulation are those directly in radial alignment with the pins which, as noted, may be removed to accommodate the tension elements.

The pins are advantageously tubular to minimize weight and cost and can be simply pressed onto the wire-receiving eye hook or other formations of the inner metal band. The inner ends of the pins are preferably pointed or generally conical to facilitate withdrawal of the pins when they are to be replaced by the tension elements.

The tension elements according to the invention, may be wire, filaments or bands of insulating material or metal, having a low heat conductivity and high tensile strength. Surprisingly, it has been found that thin metal wire of satisfactory tensile strength has a relatively small cross-section so that the thermal conductivity is at a minimum. The tension elements preferable are connected along the outer periphery of the mass of insulation to a retaining band upon which the outer conduit is fitted.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
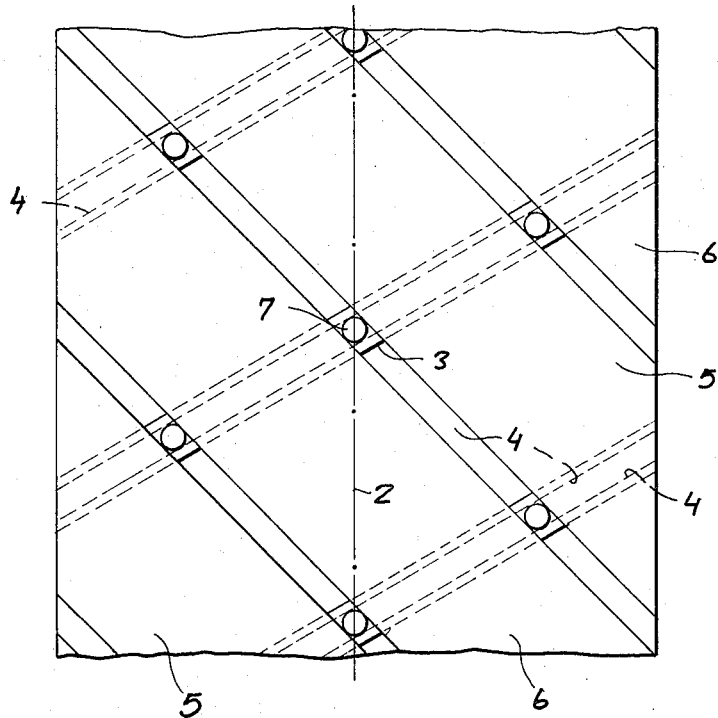
FIG. 1 is a diagrammatic illustration of the system of the present invention.

Referring first to FIG. 1, it can be seen that the tubular pins 7 are mounted perpendicularly on a metal band 3 which is wound helically upon an inner tube 1. The pitch angle, the angle between the metal band 3 and the longitudinal axis 2 of the inner tube, is about 60°.

Three pins 7 are provided per turn of the metal band 3 so that three equal distances are provided between the successive pins of each winding. Taken in cross-section, therefore, the pins are offset from one another, when the band 3 is wrapped around the inner tube, by angles of 120°, this angle having been found to provide a highly stable positioning of the inner tube in the outer tube.

The inner tube 1 is provided in the direction of winding of the metal band 3 with a heat-insulating band of a superinsulation of the type described above wherein a layer of fibrous or cellular material is provided with a layer of reflective foil or is sandwiched between foil layers as described in the aforementioned application. The band has width corresponding to the distance between the pins 7 of one turn to the pins 7 of the other turn so that only small strips of the surface of inner tube 1 are not covered by the band 4. These small insulation-free strips are, however, covered by further insulating bands 5 and 6 which lie in the same plane and are wound in the opposite direction to that of band 4. The direction of winding of the bands 4, 5 and 6 are represented by arrows in FIG. 1. The band-like insulation material of FIG. 1 is shown to be used in two layers with crossing direction of helical wrapping. Between the bands 5 and 6, a narrow strip having a width approximately equal to the diameter of the pins 7 remains, although these strips lie directly above the insulating bands 4 except where the strips of bands 4 and bands 5, 6 cross at the pins. The insulation may also include additional bands, applied opposite the direction of wrapping of the bands 5 and 6 as described in connection with FIG. 2.

From the latter Figure, it can be seen that the band 4 has a width $d_4$ which is approximately equal to the spacing $d_7$ between the pins 7 of two successive turns if these pins 7 are considered to lie in a common axial plane through the pipe 1. As a result, the gap $S_3$ between successive turns of the insulating band 4 is smaller than the width $S'_3$ of the metal band 3 carrying the pins 7. The spacing between the pins 7 represented at $d'_7$ may equal the width $d_5$ of the bands 5 and 6.

Figure 3:
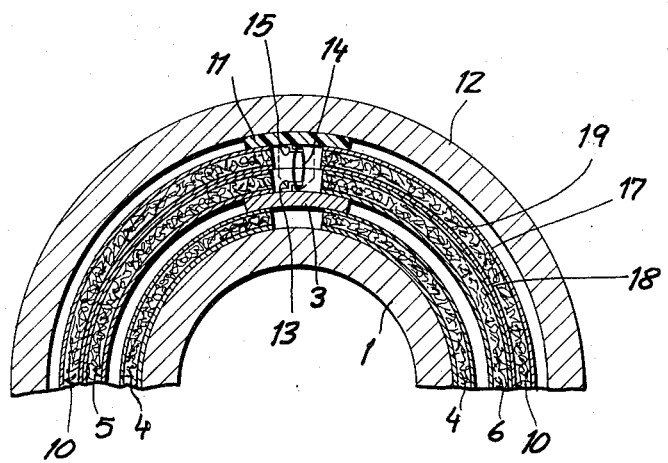
FIG. 3 is a cross-section through the pipe of FIG. 2.
Figure 2:
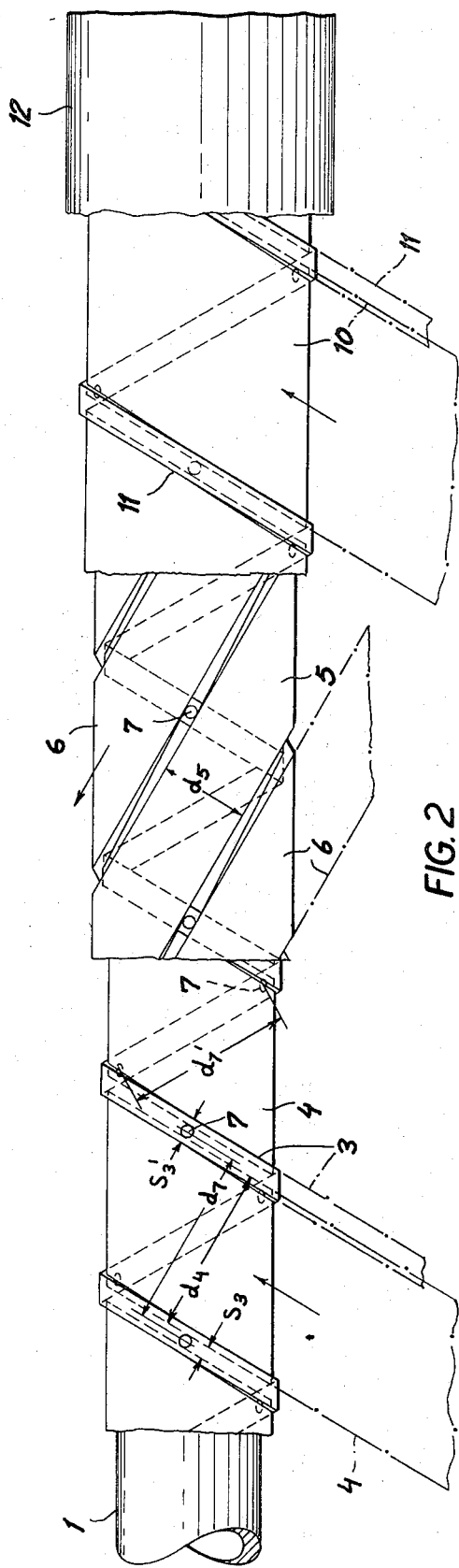
FIG. 2 is a view of the inner pipe showing the several wrappings of the present invention.

In the system of FIG. 2, the additional band 10, which is wound in the same direction as band 4, has a width equal to that of band 4 and is overlapped, once the pins 7 are removed, by a holding strip or retainer 11 over which the outer tube 12 can be applied as shown in FIG. 3. When the assembly is complete, the space between the outer tube 12 and the inner tube 1 is evacuated.

Figure 5:
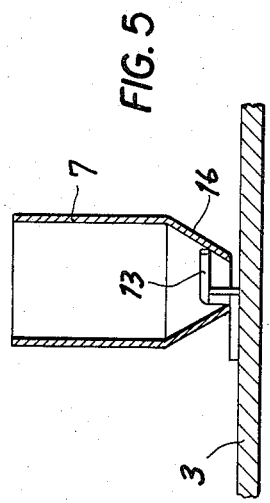
FIG. 5 is an elevational view thereof.
Figure 4:
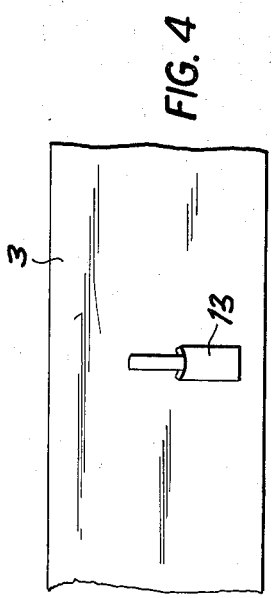
FIG. 4 is a plan view of an anchor for the tension elements according to the invention.

As shown in FIG. 4, the metal band 3 is provided with spaced-apart eyes or hooks 13 which may receive a wire loop 14 (FIG. 3) connected to similar eyes 15 on the retaining strip 11 to support the inner tube within the outer tube under the tension of the elements 14. The tubular pins 7 are, as shown in FIG. 5, provided with inwardly tapered conical ends 16 which are removably fitted over the eyes 13 to enable these pins to be withdrawn in a convenient manner.

As is also apparent from FIG. 3, each band of insulation may comprise a pair of metal foil layers 17 and 18 sandwiching a cellular layer of fiberglass or the like between them.

I claim:

1. A method of making an insulated conduit comprising the steps of:
   mounting a plurality of general radial spacer elements at spaced locations along an inner pipe;
   wrapping said inner pipe with insulating material around said spacer elements and in a plurality of layers to substantially the tops of said elements;
   removing said elements; and
   enclosing the insulating-wrapped inner pipe with an outer pipe while suspending said inner pipe within said outer pipe under tension at locations vacated by said spacer elements.

2. The method defined in claim 1 wherein said spacer elements are mounted on said inner pipe by helically wrapping a band containing said elements at spaced locations around the outer wall of said inner pipe.

3. The method defined in claim 2 wherein said band carrying said spacer elements is composed of metal and said elements are metal tubes.

4. The method defined in claim 3 wherein said insulating material is wrapped around said inner pipe in a plurality of layers in helical bands wound in opposite directions.

5. The method defined in claim 4, further comprising applying a retaining band around the insulation on said inner pipe and anchoring said retaining band to the band originally carrying said spacer elements with tension members, said outer pipe being applied over said retaining band.

6. The method defined in claim 5, further comprising the step of evacuating the space between said pipes.

7. An insulated conduit assembly comprising:
an inner pipe, a metal band wound around the outer wall of said inner pipe generally helically and provided with anchoring formations at equispaced locations along said band;
a plurality of layers of thermal insulation formed in oppositely helically wrapped bands surrounding said pipe and having spaced turns whereby the spaces between turns of said layers cross in radial alignment with said formations;
a retaining band overlying said insulation and provided with formations at the crossing locations of the insulating bands;
respective tension elements interconnecting the formations of said metal band and the formations of said retaining band under tension; and
an outerpipe fitted over said retaining band.

8. The assembly defined in claim 7 wherein said formations of said metal band are adapted to releasably accommodate tubular spacer pins for maintaining access to said formations upon the wrapping of said insulating bands around said inner pipe, said pins having inwardly tapering extremities.

9. The assembly defined in claim 8 wherein said bands of insulation each consist of at least one reflective metal-foil layer and a cellular layer bonded to said metal foil layer.

10. The assembly defined in claim 9 wherein said elements are thin metal wires.

* * * * *